United States Patent [19]
Minami et al.

[11] Patent Number: 5,098,161
[45] Date of Patent: Mar. 24, 1992

[54] RESTRAINT AND PROTECTION SEAT FOR INFANT

[75] Inventors: Yoshihiko Minami; Shingo Nakahara, both of Shiga, Japan; Kenneth Grange, London, England

[73] Assignee: Takata Corporation, Japan

[21] Appl. No.: 601,624

[22] Filed: Oct. 23, 1990

[30] Foreign Application Priority Data

Oct. 24, 1989 [JP] Japan .................. 1-276290

[51] Int. Cl.$^5$ ........................................... A47D 15/00
[52] U.S. Cl. .................................. 297/464; 297/467; 297/250; 297/216; 297/488
[58] Field of Search ............... 297/464, 487, 488, 250, 297/216

[56] References Cited

U.S. PATENT DOCUMENTS

| | | | |
|---|---|---|---|
| 2,805,081 | 9/1957 | Frimet | 297/487 X |
| 3,165,333 | 1/1965 | Dalgleish | 297/487 X |
| 4,342,483 | 8/1982 | Takada | 297/488 |
| 4,632,460 | 12/1986 | Meeker et al. | 297/467 |
| 4,655,506 | 4/1987 | Wise et al. | 297/488 X |
| 4,687,255 | 8/1987 | Klanner et al. | 297/488 |
| 4,819,988 | 4/1989 | Hellstrom | 297/467 |
| 4,909,574 | 3/1990 | Sedlack | 297/488 |

Primary Examiner—Peter A. Aschenbrenner
Attorney, Agent, or Firm—Armstrong, Nikaido, Marmelstein, Kubovcik & Murray

[57] ABSTRACT

The restraint and protection seat 1 for an infant includes a seat main unit 2, an infant seat belt 4 mounted on this seat main unit 2, a breast pad 5 mounted on the tip of this infant seat belt 4, and a fastening device to fasten the breast pad 5 on the seat main unit when the infant seat belt 4 is attached on an infant's body. The fastening device is provided with a receiving member 6 mounted on the breast pad 5 and with a fastening member mounted on the seat main unit 2 and to removably fasten the receiving member 6. The fastening device is arranged on the seat main unit 2 and is freely moved in a front-to-back direction by the screw device 28. Thus, the infant seat belt 4 and the breast pad 5 can be continuously adjusted and can be fitted to an infant of any physical shape.

4 Claims, 3 Drawing Sheets

RESTRAINT AND PROTECTION SEAT FOR INFANT

BACKGROUND OF THE INVENTION

The present invention relates to a restraint and protection seat for an infant, which is provided on a seat of a vehicle such as an automobile and is fixed on a vehicle seat by a seat belt furnished on the vehicle seat.

In a vehicle such as an automobile, a restraint and protection seat for an infant has been used in the past to restrain the infant in a sitting posture during driving and to protect the infant from the impact and the shock during acceleration or deceleration of the vehicle.

FIG. 4 shows an example of a restraint and protection seat for an infant in general use. As it is evident from FIG. 4, a restraint and protection seat for an infant comprises a seat main unit 2, on which the infant sits, and a base 3 supporting the seat main unit 2 at a reclinable position.

The seat main unit 2 is furnished a) with a seat belt 4 to restrain the infant and b) with a breast pad 5, mounted on the tip of the seat belt 4.

At the front end of the breast pad 5, a tongue is provided, and the seat main unit 2 is furnished with a buckle 7 to removably restrain this tongue. Namely, by inserting the tongue 6 into a hole 7a of the buckle 7, the tongue 6 is held by the buckle 7. When the release button 8 is pressed, the engagement between the tongue 6 and the buckle 7 is released. When the tongue 6 is engaged with the buckle 7, the infant is held by the infant seat belt 4 and the breast pad 5.

The base 3 of the restraint and protection seat 1 for the infant with such an arrangement is placed on a seat 9 of the vehicle. After inserting the seat belt 10 furnished on the vehicle seat 9 into the mounting hole 11 or 12 on the seat main unit 2 and tightening it, it is fixed on the vehicle seat 9.

When an infant is held by a restraint and protection seat 1, it is preferable that the infant seat belt 4 and the breast pad 5 closely fit the infant.

However, physical size and shape differ according to each child. Also, an infant grows fast, and the physical shape of the child extensively changes within a short period of time in many cases. Thus, it is necessary to closely fit the infant seat belt 4 and the breast pad 5 to the infant to adapt to various physical shapes of the infants and to overcome rapid change in physical shape.

Conventionally, the positions of the infant seat belt 4 and breast pad 5 have been adjusted in such a manner that the positions of tongue 6 and buckle 7 are adjusted in several steps in a front-to-back direction by engaging the buckle 7 into several grooves furnished in the front-to-back direction. Such a techniques and similar technique have been disclosed by the Japanese Provisional Utility Model Publication No. 62-52530, the Japanese Provisional Utility Model Publication No. 64-1557, and the Japanese Provisional Patent Publication No. 62-116337.

However, such adjustment of positions in several steps may not provide a perfect fit between the infant's body and the infant seat belt 4 or breast pad 5 because of the relationship of the physical shape of the infant with the stepwise adjustment. The imperfect fit between the infant's body and the infant seat belt 4 or breast pad 5 gives discomfort to the infant instead of a relaxed feeling.

In the conventional position adjustment method, locking and lock releasing operations are performed independently from the position adjusting operation in many cases, and this makes the adjusting operation very bothersome to the operator.

To solves these problems, it is an object of the present invention to offer a restraint and protection seat for an infant, by which it is possible to adjust the positions continuously and to provide perfect fit between the infant and the infant seat belt as well as the breast pad.

Another object of the invention is to offer a restraint and protection seat for an infant, which can improve the maneuverability of the seat.

SUMMARY OF THE INVENTION

To attain the above objects, the present invention comprises a seat main unit, an infant seat belt mounted on this seat main unit, a breast pad mounted on the tip of this infant seat belt, and a fastening device to fasten the breast pad on the seat main unit when the infant seat belt is attached. A fastening device is provided with a receiving member mounted on the breast pad and a fastening member to removably fasten the receiving member mounted on the breast pad. The fastening member is disposed on the seat main unit by a screw device so that it can move in a front-to-back direction.

Also, the present invention is characterized in that a locking device is provided to hold the breast pad at the predetermined position.

Further, the present invention is characterized in that the locking device is to lock the screw device to hold the breast pad at the predetermined position.

In addition, the present invention is characterized in that an operating handle to operate the screw device is movably provided between the non-operating position where it is maintained in a normal state and the operating position where it is positioned to operate the screw device, and that the locking device is furnished in coordination with the seat main unit when the operating handle is maintained at the non-operating position.

In the restraint and protection seat for an infant according to this invention with the above arrangement, the fastening member to removably fasten the receiving member on the breast pad can be moved in a front-to-back direction by the screw device. Therefore, the fastening position of the receiving member and the fastening member is continuously changed in the front-to-back direction. As the result, the infant seat belt and the breast pad can be moved in the front-to-back direction. Thus, the infant seat belt and the breast pad can be fitted to an infant of any physical shape.

Because the breast pad is maintained at the predetermined position by the locking device, the infant seat belt and the breast pad can be perfectly maintained at a position which fits the infant. In this case, if the locking device has such a structure as to lock the screw device, the locking device can be designed in a simple structure because it is only to lock the rotation of the screw.

Further, because the operating handle to operate the screw device provides the locking device in coordination with the seat main unit, a locking operation, a lock releasing operation and the operation to operate the screw device can be performed by a single series of operations. This results in a simplified operation for position adjustment and in the improvement of maneuverability.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 4:
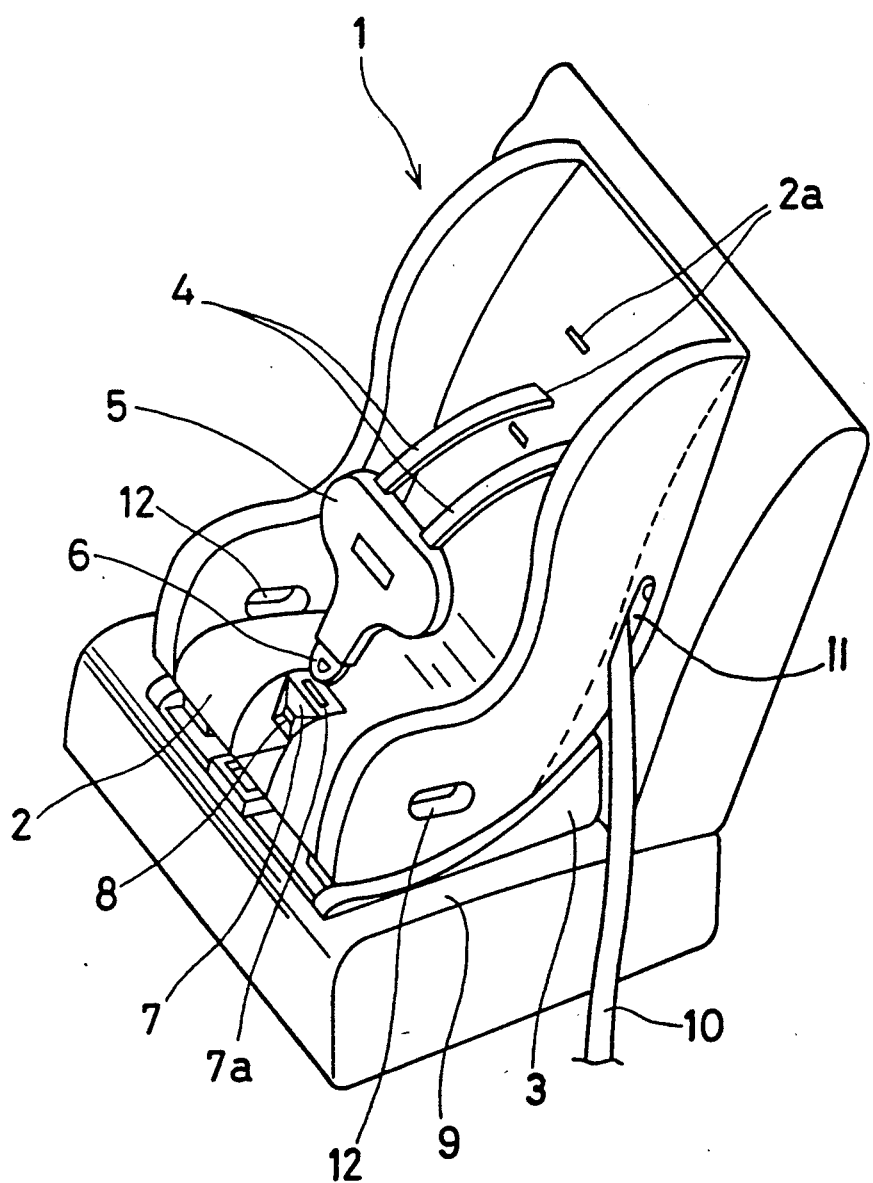
FIG. 4 is a perspective view of an example of the mounting condition of a conventional type restraint and protection seat for an infant on a vehicle seat.

In the following, the embodiments of the invention will be described in connection with the drawings. The same components as in the restraint and protection seat 1 for infant of FIG. 4 are referred to by the same numbers and symbols, and a detailed description is given here only for the components, which are different from those in FIG. 4.

Figure 1:
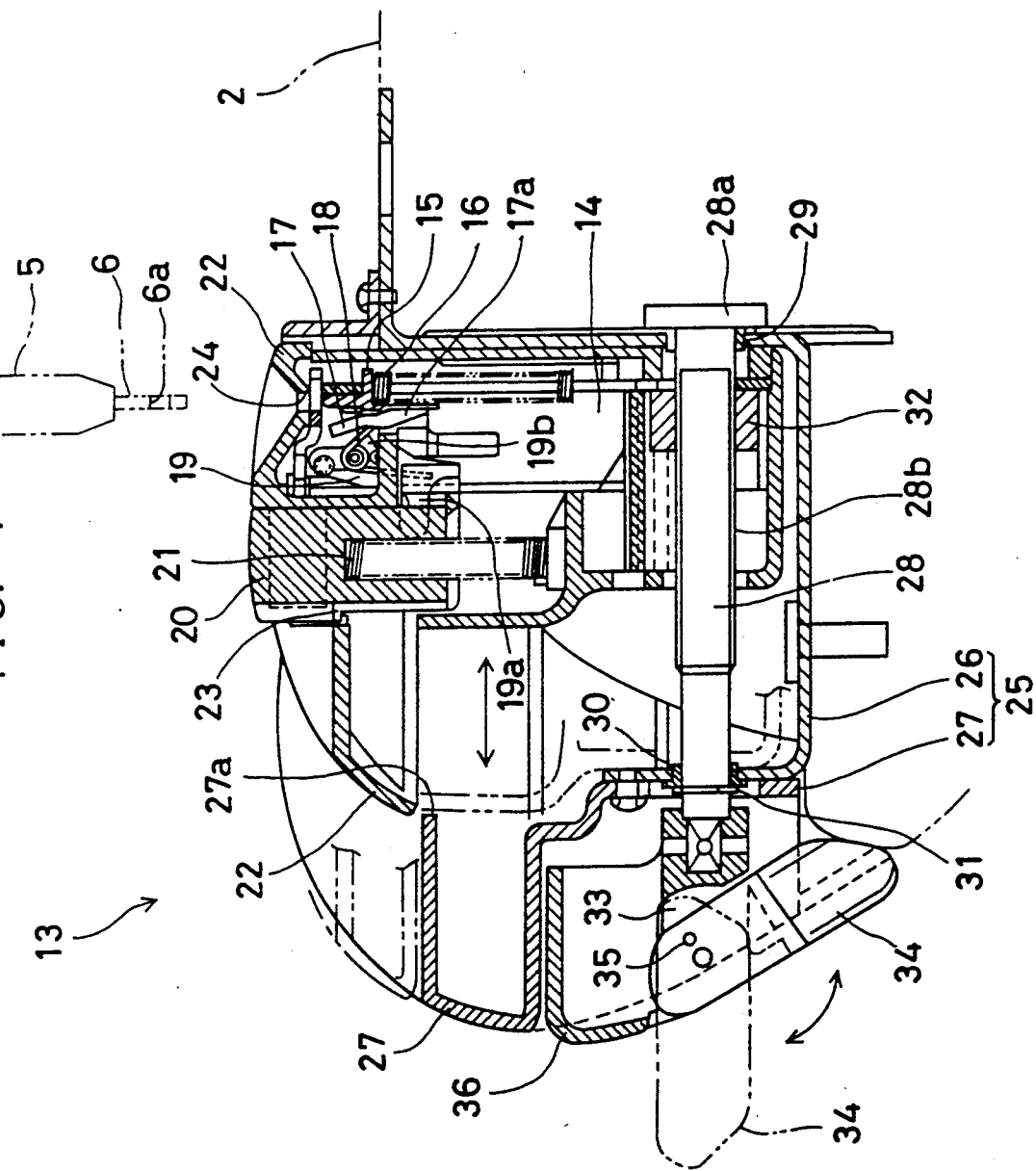
FIG. 1 is a longitudinal sectional view of the buckle and the position adjustment unit to be used in an embodiment of the restraint and protection seat for an infant according to the present invention.
Figure 2:
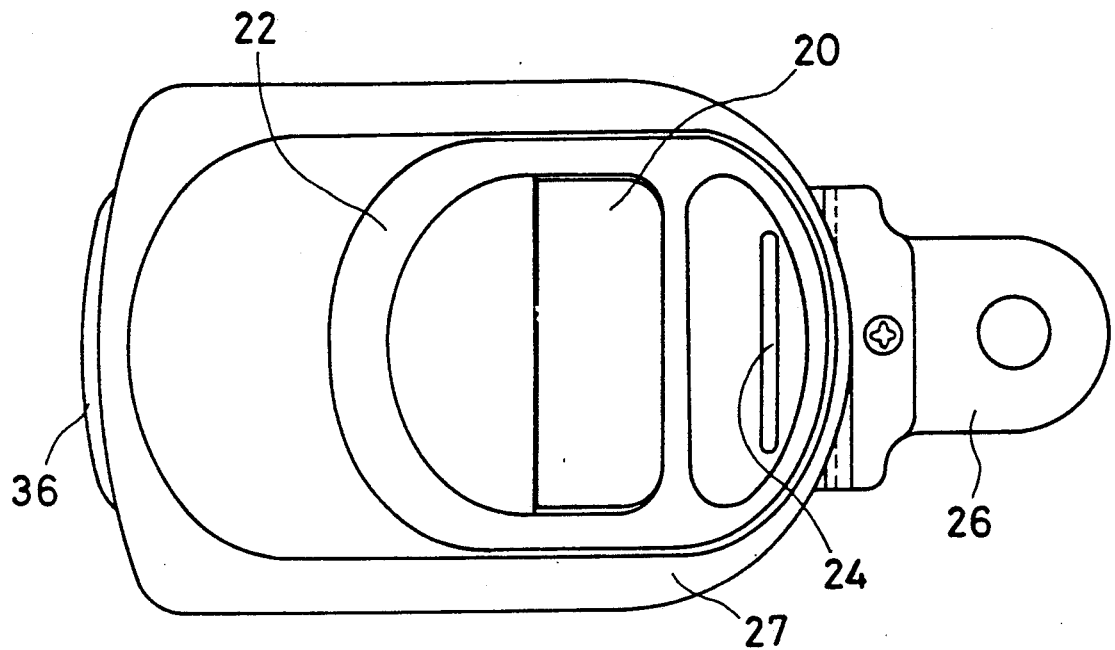
FIG. 2 is a plan view of the same.
Figure 3:
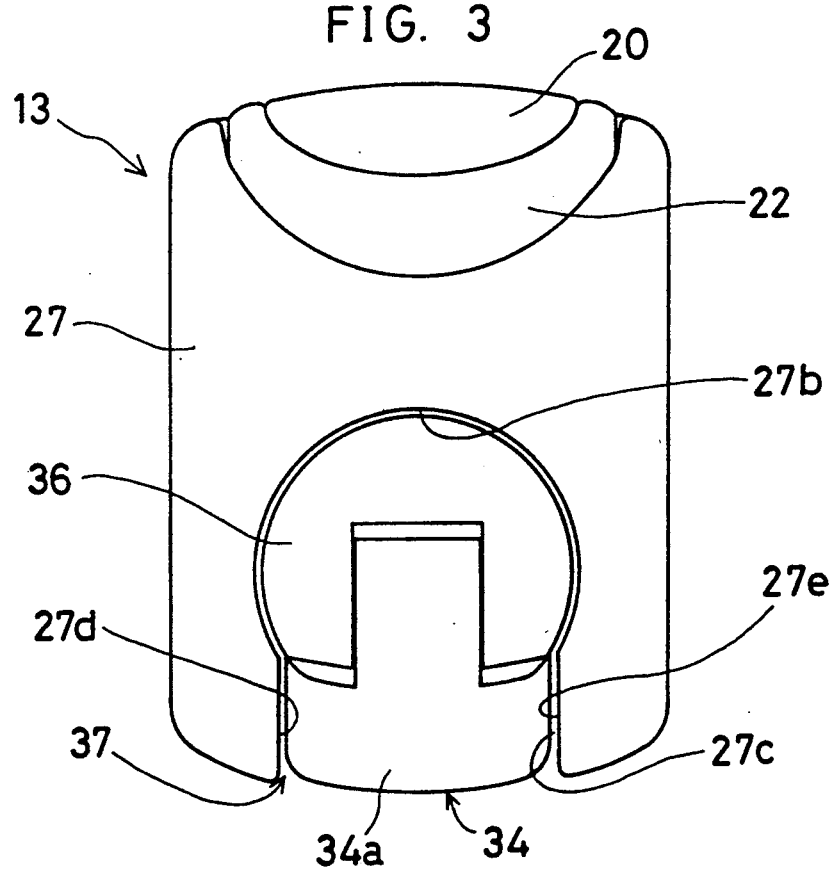
FIG. 3 is a frontal view of the same.

As shown in FIG. 1 to FIG. 3, the buckle and the position adjustment unit 13 are provided with a base unit 14, and an ejector 15 is movably furnished on the base unit 14 in a vertical direction. This ejector 15 is pushed permanently upward by a spring 16, and it is normally maintained at the upper limit position. A latch member 17 having a latch 17a is rotatably furnished above the base unit 14. This latch member 17 is permanently pushed counterclockwise by a latch spring 18, and the latch 17 touches the lateral surface of the ejector 15.

On the base unit 14, a lever 19 is rockably disposed, and the latch spring 18 is mounted on this lever 19. On the front surface of the lever 19, a projection 19a protruding forward is formed, and a circular projection 19b is furnished on the rear side of the lever 19. Further, in front of this lever 19, a release button 20 is provided to freely move in the vertical direction, and this release button 20 is permanently pushed upward by a spring 21 and is maintained at the upper limit position. On a cam groove (not shown) furnished on the rear side of the release button 20, the projection 19a of the lever 19 is engaged. When the release button 20 is pressed down, the projection 19a is gradually pushed backward by the cam of the release button 20, and the lever 19 is rotated counterclockwise. When the lever 19 is rotated counterclockwise, the circular projection 19b rotates the latch member 17 clockwise.

An upper cover 22 is provided on the upper end of the base unit 14, and the release button 20 is engaged in a hole 23 formed on this upper cover 22 to freely slide in a vertical direction. On the upper cover 22, an insertion hole 24 to receive a tongue 6 is furnished right above the ejector 15.

Thus, the base unit 14, on which each of these components and members are mounted, is accommodated in a position adjustment unit main body 25. This main body consists of a mounting bracket 26 fixed on the seat main unit 2 and of an adjusting cover 27 mounted on this mounting bracket 26. A screw rod 28 having male screw 28b is provided, passing through the lower portion of the main body 25 and the lower portion of the base unit 14, and this screw rod 28 is rotatably supported on the mounting bracket 26 by a pair of bearings 29 and 30. This screw rod 28 is blocked from moving forward by a flange unit 28a formed on its rear end and from moving backward by a C-ring 31. In other words, the screw rod 28 is blocked from moving in an axial direction and it is only rotatable.

On the male screw 28b, a female screw member 32 fixed on the base unit 14 is engaged. When the screw rod is rotated, the female screw member 32 is moved in a front-to-back direction. Therefore, by the rotation of the screw rod 28, the base unit 14 and the components and the members mounted on the base unit 14 can be moved in a front-to-back direction within the area of the opening 27a formed on the upper end of the adjusting cover 27, i.e. between the solid line, showing the most backward position, and the two-dot chain line, showing the most forward position. The opening 27a of the adjusting cover 27 is covered by the upper cover 22 even when the base unit 14 is at the most backward position in order not to impair external appearance.

A connecting member 33 is fixed on the front end of the screw rod 28, and an operating handle 34 is mounted on this connecting member 33 to freely rotate in a front-to-back direction. Between the connecting member 33 and the operating handle 34, a fastening means 35 is provided, which comprises a small ball pushed by a spring and a recessed portion to receive the small ball. By this fastening means 35, the operating handle 34 is always maintained at the non-operating position as shown by the solid line in the figure. By rotating the operating handle 34, it is moved to the operating position shown by the two-dot chain line on the same axis as the screw rod 28.

A cylindrical handle cover 36 is integrally mounted on the mounting bracket 26 to enclose the connecting member 33 and the operating handle 34. In this case, as shown in FIG. 3, the adjusting cover 27 is furnished with a hole 27b having a circular cross-section and a rectangular hole 27c formed continuously with this hole 27b. The handle cover 36 is engaged in the hole 27b, and the tip 34a of the operating handle 34 at a non-operating position is engaged in the hole 27c. When the operating handle 34 is at the non-operating position, the adjusting cover 27, the handle cover 36 and the operating handle 34 are fastened to form a approximately continuous curve to give a better external appearance.

Further, when the operating handle 34 is at the non-operating position, the front end 34a of the operating handle 34 is placed between the portions 27d and 27e of the adjusting cover 27, which form both ends of the hole 27c. Accordingly, the screw rod 28 cannot be rotated under this condition. In other words, the front end 34a of the operating handle 34 and the portions 27d and 27e of the adjusting cover 27 form a locking means 37 to block the rotation of the screw rod 28.

Next, a description is given about the operation of the restraint and protection seat for an infant of this invention.

The restraint and protection seat 1 for an infant is placed on a seat 9 of a vehicle such as an automobile similarly to the conventional seat of this type, and it is maintained and fixed on the seat 9 by inserting the seat belt 10 on the seat 9 into the mounting hole 11 of the seat main unit 2 and by tightening it. Then, an infant is seated on the seat main unit 2 and an infant seat belt 4 is placed on both shoulders of the infant, and a breast pad 5 is attached on the infant's body from breast to abdomen. Then, a tongue 6 below the breast pad 5 is inserted into a buckle and an insertion hole 24 of a position adjusting unit 13. Further, the tongue 6 is pushed in to the predetermined length while moving the ejector 15 downward, and the latch 17a of the latch member 17 is engaged in the fastening hole 6a of the tongue 6. Thus, the tongue 6 is fastened in the buckle 7.

In this case, if the infant seat belt 4 and the breast pad 5 do not fit the infant's body in a vertical direction, the hole 2a on seat main unit 2, through which the infant seat belt 4 is passed, is changed to perform a vertical adjustment. If the infant seat belt 4 and the breast ped 5 do not fit the infant's body in a front-to-back direction, the operating handle 34 is rotated forward until it becomes coaxial to the screw rod 28. By turning the operating handle 34 to either left or right under this condition, the screw rod 28 is rotated, and the base unit 14 is continuously moved in a front-to-back direction. In so doing, the fastening position of the tongue 6 and the buckle is also moved continuously in a front-to-back direction. When the infant seat belt 4 and the breast pad 5 closely fit the infant's body, the rotating operation of the operating handle 34 is stopped, and the fastening position of the tongue 6 and buckle is stopped as it is. In case the operating handle 34 cannot be engaged into the hole 27c as shown in FIG. 3 when it is rotated to a non-operating position, the operating handle 34 is turned to either the left or right until it can be inserted into the hole 27c. By this rotating of the operating handle 34, the base unit 14 can also be moved in a front-to-back direction. However, in order to rotate the operating handle 34 to the position where it can be inserted into the hole 27c, it is to be rotated by one-half turn at the maximum. Accordingly, the base unit 14 is to be moved in a front-to-back direction only by half a pitch of the screw rod 28 at the maximum, and the front-to-back moving distance of the base unit 14 is short. Therefore, this does not influence the fit of the infant seat belt 4 and the breast pad 5. Under this condition, the operating handle 34 is turned to the non-operating position, and the operating handle 34 is maintained at the non-operating position by the fastening means 35. When the operating handle 34 is maintained at the non-operating position, the front end 34a of the operating handle 34 is inserted into the hole 27c, and the rotation of the operating handle 34 is blocked by the portions 27d and 27e of the adjusting cover 27. Accordingly, the screw rod 28 is also blocked from rotating, and the base unit 14 cannot be moved in the front-to-back direction. Thus, the fastening position of the tongue 6 and the buckle is maintained at the fitting position, and the position adjustment is completed.

As the result, the infant is restrained in a perfect fit.

When the release button 20 is pressed to release the holding, the lever 19 is rotated counterclockwise, and the latch member 17 is rotated clockwise. Thus, the fastening between the latch 17a and the tongue 6 is released. By pulling the tongue 6 upward from the insertion hole 24 of the buckle, the infant is released from the restraint.

In the present embodiment of this arrangement, the fastening position of the tongue 6 and the buckle is continuously moved by the screw rod 28, and the fastening position can be continuously adjusted according to the physical shape of the infant. In this case, when the operating handle 34 is locked at the non-operating position; the fastening position is moved by half of a pitch of the screw rod 28 at the maximum, but this does not influence the fit. Therefore, it is regarded that the position can be continuously adjusted.

Also, because the locking operation and the position adjusting operation simply consist of a series of operations including the rotation of the operating handle 34 to the operating position, the rotation of the screw rod 28, and the rotation of the operating handle 34 to the non-operating position, the adjustment operation can be achieved even by using only one hand.

The present invention is not limited to the above embodiment, and various design modifications are conceivable.

For example, in the above, the operating handle 34 is rotated between the non-operating position and the operating position relative to the connecting member 33, whereas the operating handle 34 can be slid in an axial direction relative to the connecting member 33. In this case, it is preferable that the operating handle 34 can be moved between the non-operating position where it is accommodated within the handle cover 36 almost completely and the operating position where it is pulled out from the handle cover 36. Moreover, it would be more convenient if the operating handle 34 is permanently pushed toward the non-operating position by an adequate pushing means such as a spring.

As it is evident from the above description, it is possible by the restraint and protection seat for an infant according to this invention to continuously change the fastening position of the receiving member and the fastening member because the fastening member and the receiving member on the breast pad can be moved in a front-to-back direction by a screw means. Therefore, the infant seat belt and the breast pad can fit an infant of any physical shape.

Because the breast pad is maintained at the predetermined position by the locking means, the infant seat belt and the breast pad can be maintained at the fitting position. In this case, if the locking means has such a structure as to lock the screw means, only the locking of the screw rotation would suffice, and the design of the locking means can be simplified.

Further, because the operating handle to operate the screw means forms the locking means in coordination with the seat main unit, a locking operation, a lock releasing operation and the operation to operate the screw means can be performed by a single series of operations. This results in a simplified position adjusting operation and in the improvement of maneuverability.

What we claim is:

1. A restraint and protection seat for an infant, comprising:
    a seat main unit;
    an infant seat belt mounted on said seat main unit;
    a breast pad mounted on a tip of said infant seat belt;
    a fastening means to fasten said breast pad on said seat main unit when said infant seat belt is attached on an infant's body, said fastening means is provided with
    a screw means,
    a tongue member mounted on said breast pad, and
    a fastening member, mounted on said seat main unit, to removably fasten said tongue member, and said fastening member is furnished on said seat main unit and is freely moved in a front-to-back direction by said screw means.

2. A restrain and protection seat for an infant according too claim 1, further comprising a locking means provided on said fastening member to maintain said breast pad at a predetermined position.

3. A restraint and protection seat for an infant according to claim 2, wherein said locking means is to lock said screw means to maintain said breast pad at the predetermined position.

4. A restraint and protection seat for an infant according to claim 3, further comprising an operating handle to operate said screw means, said operating handle is movably furnished between a non-operating position where said operating handle is normally maintained and an operating position where said operating handle is positioned to operate said screw means, and said locking means is formed in coordination with said seat main unit when said operating handle is maintained at said non-operating position.

* * * * *